(12) United States Patent
Fujino

(10) Patent No.: US 12,302,880 B2
(45) Date of Patent: May 20, 2025

(54) APPARATUS FOR SPOOLING AND DE-SPOOLING FISHING LINE

(71) Applicant: Alexa Byron Fujino, Sunnyvale, CA (US)

(72) Inventor: Alexa Byron Fujino, Sunnyvale, CA (US)

( * ) Notice: Subject to any disclaimer, the term of this patent is extended or adjusted under 35 U.S.C. 154(b) by 200 days.

(21) Appl. No.: 18/220,889

(22) Filed: Jul. 12, 2023

(65) Prior Publication Data
US 2025/0017187 A1   Jan. 16, 2025

(51) Int. Cl.
  *A01K 89/00*  (2006.01)
(52) U.S. Cl.
  CPC .................. *A01K 89/003* (2013.01)
(58) Field of Classification Search
  None
  See application file for complete search history.

(56) References Cited

U.S. PATENT DOCUMENTS

| | | | | |
|---|---|---|---|---|
| 335,826 A * | 2/1886 | Elisha | ................ | A01K 89/003 242/317 |
| 2,040,567 A * | 5/1936 | Rowe | ................ | A01K 97/16 43/25 |
| 2,492,515 A * | 12/1949 | Beard | ................ | A01K 89/003 242/388.6 |
| 2,899,148 A * | 8/1959 | Brainard | ................ | A01K 89/003 248/214 |
| 2,903,196 A * | 9/1959 | Fowler | ................ | A01K 89/003 242/395 |
| 3,820,737 A * | 6/1974 | Hults | ................ | A01K 89/003 423/625 |
| 4,739,946 A * | 4/1988 | English | ................ | A01K 89/003 43/25 |
| 5,218,779 A * | 6/1993 | Morgan | ................ | A01K 89/003 43/25 |
| 5,551,645 A * | 9/1996 | Torvund | ................ | B65H 59/04 242/395 |
| 5,709,350 A * | 1/1998 | Davis | ................ | B65H 54/2812 242/390.8 |
| 5,725,172 A * | 3/1998 | Koehler | ................ | A01K 89/00 242/395 |
| 6,224,011 B1 * | 5/2001 | Gavaza, III | ................ | A01K 89/003 242/406 |
| 6,609,673 B1 * | 8/2003 | Johnson | ................ | B65H 49/327 43/25 |
| 8,919,690 B1 * | 12/2014 | Fromm | ................ | A01K 89/003 242/390.8 |
| 10,231,444 B1 * | 3/2019 | Nelson | ................ | A01K 89/003 |
| 10,499,624 B2 * | 12/2019 | Wang | ................ | A01K 89/01931 |
| 10,701,916 B1 * | 7/2020 | Yu | ................ | B65H 49/327 |

(Continued)

*Primary Examiner* — William A. Rivera
(74) *Attorney, Agent, or Firm* — Andrew S. Rapacke; The Rapacke Law Group

(57) ABSTRACT

The present variations generally disclose an apparatus including a mounting base including at least two threaded rods extending from the base opposite one another. The base may define at least two recesses approximately near the two threaded rods, the two recesses being constructed and arranged to receive a reel or spool foot therein. The apparatus may include at least two foot holders constructed and arranged to secure a reel or spool within the two recesses. Optional locking nuts may be threaded onto the two threaded rods to hold the foot holders securely in place.

20 Claims, 4 Drawing Sheets

(56) References Cited

U.S. PATENT DOCUMENTS

| | | | |
|---|---|---|---|
| 11,191,259 B1* | 12/2021 | Nevius | A41D 19/0041 |
| 11,464,218 B1* | 10/2022 | Pratt | A01K 89/01925 |
| 11,606,944 B2* | 3/2023 | Thomas | A01K 89/0111 |
| 11,778,997 B1* | 10/2023 | Tennant | A01K 89/003 |
| | | | 242/223 |
| 2017/0064933 A1* | 3/2017 | Tseng | B65H 54/12 |
| 2018/0116193 A1* | 5/2018 | Rogers | A01K 89/003 |

* cited by examiner though the arrangement of such combinations are not standard. Additionally, while the embodiments set forth herein are believed to comprise features of novelty, applicants do not represent any of the disclosed combinations of features as being characterized or defining any specific inventive concept. Further, while the embodiments are described and illustrated herein as embodied in various specific combinations, it is to be appreciated that various changes in form and detail may be made without departing from the scope of the embodiments.

APPARATUS FOR SPOOLING AND DE-SPOOLING FISHING LINE

TECHNICAL FIELD

The embodiments generally relate to apparatuses for spooling and de-spooling fishing lines on fishing reels.

BACKGROUND

Spooling fly-fishing reels by hand is difficult, time-consuming, and includes a high likelihood of tangling the line during spooling.

Existing spooling devices are constructed and arranged to spool line from a spool to a reel, but not to de-spool line from a reel to a spool.

SUMMARY OF THE INVENTION

This summary is provided to introduce various concepts in a simplified form that is disclosed further in the detailed description of the embodiments. This summary is not intended to identify essential inventive concepts of the claimed subject matter, nor is it intended for determining the scope of the claimed subject matter.

The disclosed apparatus may include a mounting base including at least two threaded rods extending from the base opposite one another. The base may define at least two recesses approximately near the two threaded rods, the two recesses being constructed and arranged to receive a reel or spool foot therein. The apparatus may include at least two foot holders constructed and arranged to secure a reel or spool within the two recesses. Optional locking nuts may be threaded onto the two threaded rods to hold the foot holders securely in place.

In this way, a spool may be removably secured to one end of the base and a reel may be secured to a second end of the base. The fishing line may then be spooled from the spool to the reel or de-spooled from the reel to a spool.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
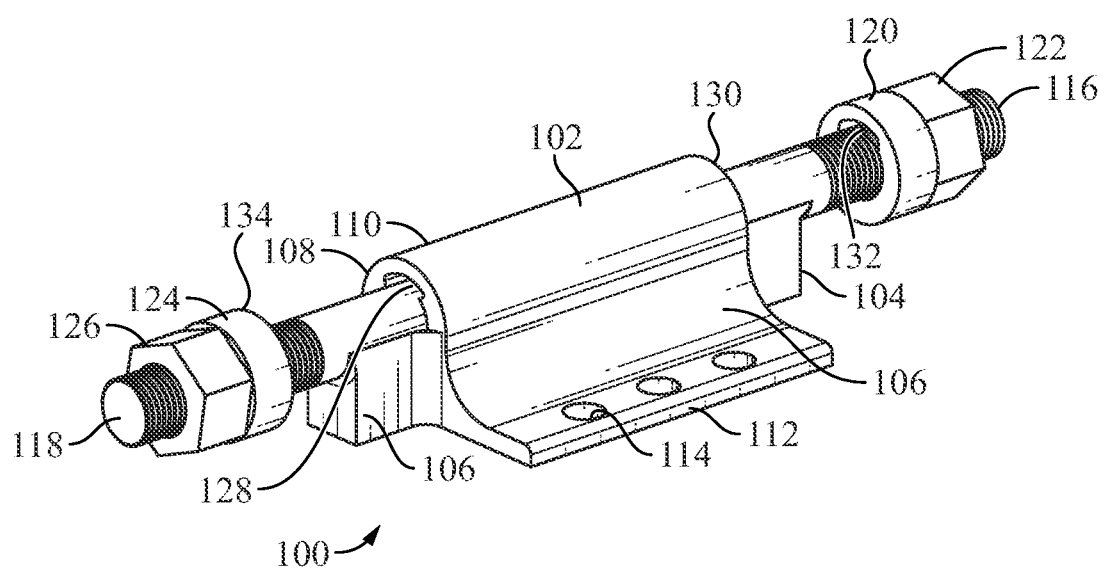
FIG. 1 includes an illustration of an apparatus for spooling and de-spooling fishing line as disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed apparatus may include a mounting base including at least two threaded rods extending from the base opposite one another. The base may include at least one flange defining at least one through hole constructed and arranged to fix the base to a surface or object. According to some embodiments, the base may include multiple flanges defining through holes such that the apparatus may be attached to a surface or object.

The threaded rods may be constructed and arranged to receive foot holders thereon as well as threading nuts constructed and arranged to secure the foot holders on the threaded rods.

The base may define at least two recesses approximately near the two threaded rods, the two recesses being constructed and arranged to receive a reel or spool foot therein. The recesses may be slots, channels, through holes, or cavities defined in the threaded rods, body, or both.

The apparatus may include at least two foot holders constructed and arranged to secure a reel or spool, and corresponding reel or spool feet, within the two recesses by sliding the foot holders over a reel or spool foot. Optional locking nuts may be threaded onto the two threaded rods to hold the foot holders securely in place.

Figure 2:
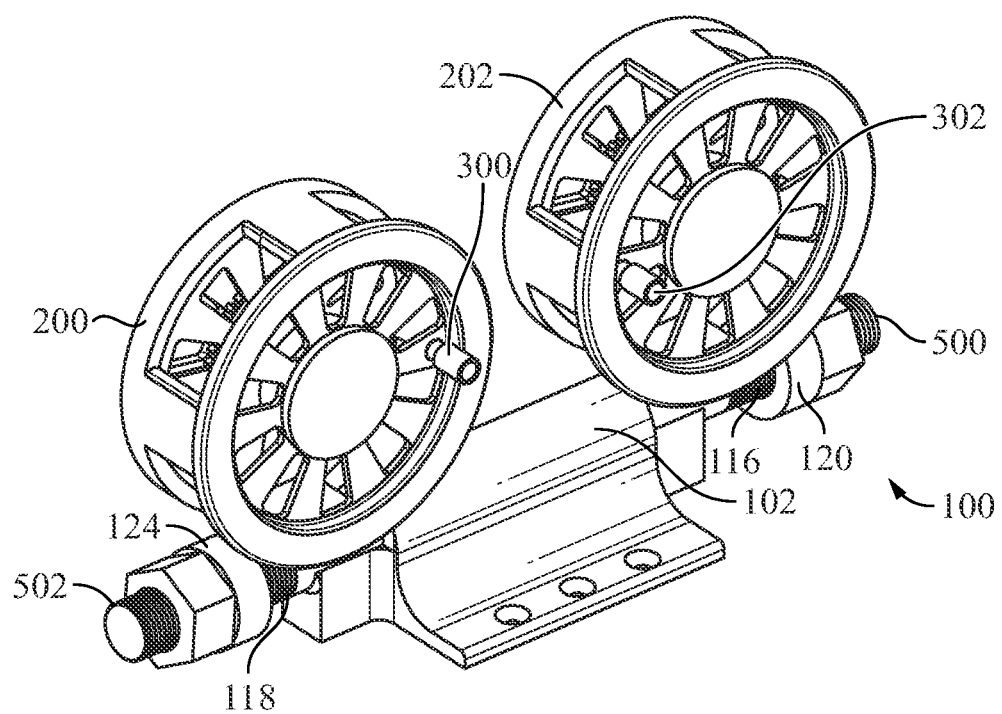
FIG. 2 includes an illustration of an apparatus for spooling and de-spooling fishing line as disclosed herein.

FIGS. 1 & 2 includes an illustration of an apparatus for spooling and de-spooling fishing line 100 including a body 102 having a first end 104 and a second end 106. The body 102 may include a first flange 112 and a second flange 110, each flange defining at least one through hole 114 constructed and arranged to facilitate attachment of the apparatus to a surface or object, such as a desk or workbench. A first threaded rod 116 may extend from the first end 104 and a second threaded rod 118 may extend from the second end 106. A first slot 130 may be defined by the body 102 and the first end 104 and a second slot 128 may be defined by the body 102 and the second end 106. The first slot 130 and the second slot 128 may be constructed and arranged to receive a spool or reel foot therein to facilitate attachment of the spool or reel to the apparatus 100. A first foot holder 120 maybe generally tubular in shape and may define a third slot 132 to receive a spool or reel foot therein to facilitate attachment of the spool or reel to the apparatus 100 a second foot holder 124 may be generally tubular in shape and may define a fourth slot 134 to receive a spool or reel foot therein to facilitate attachment of the spool or reel to the apparatus 100. A first locking nut 122 and a second locking nut 126 may be threaded onto the first threaded rod 116 and the second threaded rod 118, respectively, to secure the position of the first foot holder 120 and the second foot holder 124.

FIG. 2 includes an illustration of an apparatus for spooling and de-spooling fishing line 100 including a spool 200 and a reel 202 removably attached to the apparatus 100. The spool 200 may include a first handle 300 to facilitate rotation of the spool 200. The real 202 may include a second handle 302 constructed and arranged to facilitate rotation of the real 202.

Figure 3:
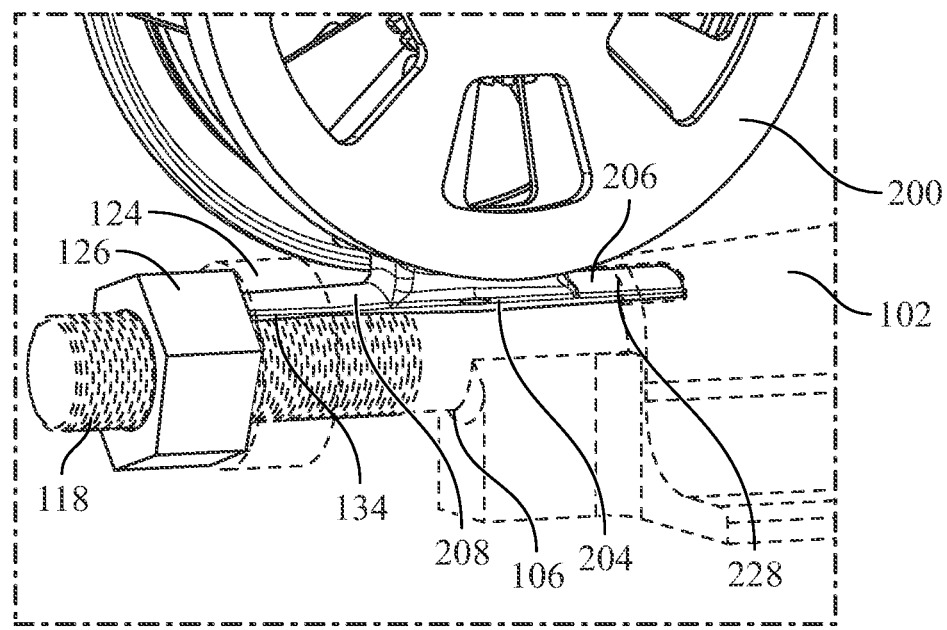
FIG. 3 includes an illustration of an apparatus for spooling and de-spooling fishing line as disclosed herein.

FIG. 3 includes a partially transparent illustration of an apparatus for spooling and de-spooling fishing line 100 getting a body 102, a second end 106, and a second threaded rod 118. FIG. 3 illustrates how a spool 200 or reel 202 may be attached to the apparatus temporarily during use. A spool 200 including a first footing 204 having a first foot 206 and a second foot 208 may be seated on the second end 106 such that the first foot 206 is seated within the second slot 228 and the second foot 208 is seated within the 4th slot 134 of the second foot holder 124, which may be held in place via second locking nut 126.

Figure 4:
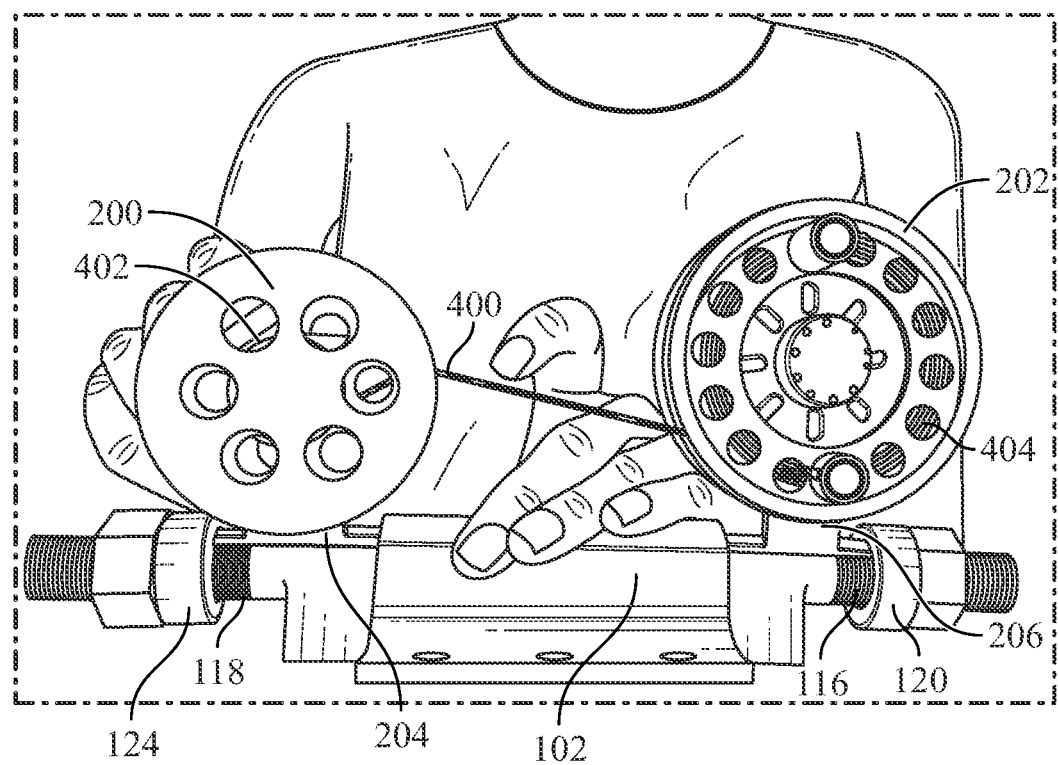
FIG. 4 includes an illustration of an apparatus for spooling and de-spooling fishing line as disclosed herein.

FIG. 4 includes an illustration of an apparatus for spooling and de-spooling fishing line 100 in use, explicitly spooling fishing line 400 from a spool 200 having spooled fishing line 402 wrapped thereon. Fishing line 400 may be spooled onto a reel 202 to form reeled fishing line 404 thereon. Similarly, fishing line 400 may be despooled from the real 202 onto the spool 200. The spool 200 may be held in place on the apparatus 100 by attaching the first footing 204 in the second slot 228 and the fourth slot 134 of the second foot holder 124. Similarly, the real 202 may be held in place on the apparatus 100 by attaching a second footing 206 in the first slot 130 and the third slot 132 of the first foot holder 120.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, an apparatus for spooling and de-spooling fishing line may include a body including a first end opposite a second end, and a first flange opposite a second flange, wherein the body defines a first slot in the first end and a second slot in the second end; a first threaded rod extending from the first end; a second threaded rod extending from the second end; a first foot holder defining a third slot; a second foot holder defining a fourth slot; a first locking nut; and a second locking nut.

Variation 2 may include an apparatus for spooling and de-spooling fishing line as in variation 1, wherein the first flange and the second flange are both constructed and arranged to facilitate attachment of the apparatus to an object.

Variation 3 may include an apparatus for spooling and de-spooling fishing line as in variation 1 or 2, wherein the first flange defines at least one first through hole constructed and arranged to facilitate attachment of the apparatus to an object.

Variation 4 may include an apparatus for spooling and de-spooling fishing line as in any of variations 1 through 3, wherein the second flange defines at least one second through hole constructed and arranged to facilitate attachment of the apparatus to an object.

Variation 5 may include an apparatus for spooling and de-spooling fishing line as in any of variations 1 through 4, wherein the first slot and the second slot are constructed and arranged to receive a spool or reel foot therein to facilitate attachment of the spool or reel to the apparatus.

Variation 6 may include an apparatus for spooling and de-spooling fishing line as in any of variations 1 through 5, wherein the first foot holder is generally tubular in shape Variation 7 may include an apparatus for spooling and de-spooling fishing line as in any of variations 1 through 6, wherein the second foot holder is generally tubular in shape.

Variation 8 may include an apparatus for spooling and de-spooling fishing line as in any of variations 1 through 7, wherein the first foot holder defines a third slot constructed and arranged to receive a spool or reel foot therein to facilitate attachment of the spool or reel to the apparatus.

Variation 9 may include an apparatus for spooling and de-spooling fishing line as in any of variations 1 through 8, wherein the second foot holder defines a fourth slot constructed and arranged to receive a spool or reel foot therein to facilitate attachment of the spool or reel to the apparatus.

Variation 10 may include an apparatus for spooling and de-spooling fishing line as in any of variations 1 through 9, wherein the first locking nut is constructed and arranged to be threaded onto the first threaded rod to secure a position of the first foot holder.

Variation 11 may include an apparatus for spooling and de-spooling fishing line as in any of variations 1 through 10, wherein the second locking nut is constructed and arranged to be threaded onto the second threaded rod to secure a position of the second foot holder.

According to variation 12, an apparatus for spooling and de-spooling fishing line may include a body including a first end opposite a second end, and a first flange opposite a second flange, wherein the body defines a first slot in the first end and a second slot in the second end; a first threaded rod extending from the first end; a second threaded rod extending from the second end; a generally tubular first foot holder defining a third slot; a generally tubular second foot holder defining a fourth slot; a first locking nut constructed and arranged to be threaded onto the first threaded rod to secure a position of the first foot holder onto the first threaded rod; and a second locking nut constructed and arranged to be threaded onto the second threaded rod to secure a position of the second foot holder onto the second threaded rod.

Variation 13 may include an apparatus for spooling and de-spooling fishing line as in variation 12, wherein the first flange and the second flange are both constructed and arranged to facilitate attachment of the apparatus to an object.

Variation 14 may include an apparatus for spooling and de-spooling fishing line as in variations 12 or 13, wherein the first flange defines at least one first through hole constructed and arranged to facilitate attachment of the apparatus to an object.

Variation 15 may include an apparatus for spooling and de-spooling fishing line as in any of variations 12 through 14, wherein the second flange defines at least one second through hole constructed and arranged to facilitate attachment of the apparatus to an object.

Variation 16 may include an apparatus for spooling and de-spooling fishing line as in any of variations 12 through 15, wherein the first slot and the second slot are constructed and arranged to receive a spool or reel foot therein to facilitate attachment of the spool or reel to the apparatus.

Variation 17 may include an apparatus for spooling and de-spooling fishing line as in any of variations 12 through 16, wherein the first foot holder defines a third slot constructed and arranged to receive a spool or reel foot therein to facilitate attachment of the spool or reel to the apparatus.

Variation 18 may include an apparatus for spooling and de-spooling fishing line as in any of variations 12 through 17, wherein the second foot holder defines a fourth slot constructed and arranged to receive a spool or reel foot therein to facilitate attachment of the spool or reel to the apparatus.

Variation 19 may include an apparatus for spooling and de-spooling fishing line as in any of variations 12 through 18, further including a spool at least partially positioned within the first slot and third slot; and a reel at least partially positioned within the second slot and fourth slot.

According to variation 20, an apparatus for spooling and de-spooling fishing line may include a body including a first end opposite a second end, and a first flange opposite a second flange, wherein the body defines a first slot in the first end and a second slot in the second end; a first threaded rod extending from the first end; a second threaded rod extending from the second end; a generally tubular first foot holder defining a third slot; a generally second foot holder defining a fourth slot; a first locking nut constructed and arranged to be threaded onto the first threaded rod to secure a position of the first foot holder; and a second locking nut constructed and arranged to be threaded onto the second threaded rod to secure a position of the second foot holder.

Several different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. An apparatus for spooling and de-spooling fishing line, comprising:
    a body comprising a first end opposite a second end, and a first flange opposite a second flange, wherein the body defines a first slot in the first end and a second slot in the second end;
    a first threaded rod extending from the first end;
    a second threaded rod extending from the second end;
    a first foot holder defining a third slot and mounted on the first end;
    a second foot holder defining a fourth slot and mounted on the second end;
    a first locking nut threaded on the first end; and
    a second locking nut threaded on the second end.

2. An apparatus for spooling and de-spooling fishing line as in claim 1, wherein the first flange and the second flange are both constructed and arranged to facilitate attachment of the apparatus to an object.

3. An apparatus for spooling and de-spooling fishing line as in claim 1, wherein the first flange defines at least one first through hole constructed and arranged to facilitate attachment of the apparatus to an object.

4. An apparatus for spooling and de-spooling fishing line as in claim 1, wherein the second flange defines at least one second through hole constructed and arranged to facilitate attachment of the apparatus to an object.

5. An apparatus for spooling and de-spooling fishing line as in claim 1, wherein the first slot and the second slot are constructed and arranged to receive a spool or reel foot therein to facilitate attachment of the spool or reel to the apparatus.

6. An apparatus for spooling and de-spooling fishing line as in claim 1, wherein the first foot holder is generally tubular in shape.

7. An apparatus for spooling and de-spooling fishing line as in claim 1, wherein the second foot holder is generally tubular in shape.

8. An apparatus for spooling and de-spooling fishing line as in claim 1, wherein the first foot holder defines a third slot constructed and arranged to receive a spool or reel foot therein to facilitate attachment of the spool or reel to the apparatus.

9. An apparatus for spooling and de-spooling fishing line as in claim 1, wherein the second foot holder defines a fourth slot constructed and arranged to receive a spool or reel foot therein to facilitate attachment of the spool or reel to the apparatus.

10. An apparatus for spooling and de-spooling fishing line as in claim 1, wherein the first locking nut is constructed and arranged to be threaded onto the first threaded rod to secure a position of the first foot holder.

11. An apparatus for spooling and de-spooling fishing line as in claim 1, wherein the second locking nut is constructed and arranged to be threaded onto the second threaded rod to secure a position of the second foot holder.

12. An apparatus for spooling and de-spooling fishing line, comprising:
    a body comprising a first end opposite a second end, and a first flange opposite a second flange, wherein the body defines a first slot in the first end and a second slot in the second end;
    a first threaded rod extending from the first end;
    a second threaded rod extending from the second end;
    a generally tubular first foot holder defining a third slot;
    a generally tubular second foot holder defining a fourth slot;
    a first locking nut constructed and arranged to be threaded onto the first threaded rod to secure a position of the first foot holder onto the first threaded rod; and
    a second locking nut constructed and arranged to be threaded onto the second threaded rod to secure a position of the second foot holder onto the second threaded rod.

13. An apparatus for spooling and de-spooling fishing line as in claim 12, wherein the first flange and the second flange are both constructed and arranged to facilitate attachment of the apparatus to an object.

14. An apparatus for spooling and de-spooling fishing line as in claim 12, wherein the first flange defines at least one first through hole constructed and arranged to facilitate attachment of the apparatus to an object.

15. An apparatus for spooling and de-spooling fishing line as in claim 12, wherein the second flange defines at least one second through hole constructed and arranged to facilitate attachment of the apparatus to an object.

16. An apparatus for spooling and de-spooling fishing line as in claim 12, wherein the first slot and the second slot are constructed and arranged to receive a spool or reel foot therein to facilitate attachment of the spool or reel to the apparatus.

17. An apparatus for spooling and de-spooling fishing line as in claim 12, wherein the first foot holder defines a third slot constructed and arranged to receive a spool or reel foot therein to facilitate attachment of the spool or reel to the apparatus.

18. An apparatus for spooling and de-spooling fishing line as in claim 12, wherein the second foot holder defines a fourth slot constructed and arranged to receive a spool or reel foot therein to facilitate attachment of the spool or reel to the apparatus.

19. An apparatus for spooling and de-spooling fishing line as in claim 12, further comprising:
  a spool at least partially positioned within the first slot and third slot; and
  a reel at least partially positioned within the second slot and fourth slot.

20. An apparatus for spooling and de-spooling fishing line, comprising:
  a body comprising a first end opposite a second end, and a first flange opposite a second flange, wherein the body defines a first slot in the first end and a second slot in the second end;
  a first threaded rod extending from the first end;
  a second threaded rod extending from the second end;
  a generally tubular first foot holder defining a third slot;
  a generally second foot holder defining a fourth slot;
  a first locking nut constructed and arranged to be threaded onto the first threaded rod to secure a position of the first foot holder; and
  a second locking nut constructed and arranged to be threaded onto the second threaded rod to secure a position of the second foot holder.

* * * * *